United States Patent
Iwamura (10) Patent No.: US 8,031,264 B2
(45) Date of Patent: Oct. 4, 2011

(54) WALL MOUNT CAMERA

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 567 days.

(21) Appl. No.: 11/680,239

(22) Filed: Feb. 28, 2007

(65) Prior Publication Data

US 2008/0136915 A1   Jun. 12, 2008

Related U.S. Application Data

(60) Provisional application No. 60/873,460, filed on Dec. 6, 2006.

(51) Int. Cl.
*H04N 5/225* (2006.01)

(52) U.S. Cl. .............. 348/373; 348/143; 348/65

(58) Field of Classification Search .......... 348/143, 348/373
See application file for complete search history.

(56) References Cited

U.S. PATENT DOCUMENTS

| | | | |
|---|---|---|---|
| 6,380,909 B1 | 4/2002 | Wilkinson et al. | |
| 6,518,724 B2 * | 2/2003 | Janik | 320/115 |
| 6,709,172 B2 * | 3/2004 | Brown | 396/427 |
| 7,853,237 B2 * | 12/2010 | Tokunaga | 455/402 |
| 2003/0025791 A1 * | 2/2003 | Kaylor et al. | 348/143 |
| 2004/0123328 A1 * | 6/2004 | Coffey et al. | 725/105 |
| 2004/0145676 A1 * | 7/2004 | Lin | 348/374 |
| 2005/0018766 A1 * | 1/2005 | Iwamura | 375/240.01 |
| 2005/0117052 A1 * | 6/2005 | Willes et al. | 348/375 |
| 2005/0155830 A1 * | 7/2005 | Huang | 191/12.2 R |
| 2005/0184867 A1 * | 8/2005 | Osann, Jr. | 340/539.25 |
| 2006/0250502 A1 * | 11/2006 | Tsao | 348/207.1 |
| 2007/0054550 A1 * | 3/2007 | Cuthbert et al. | 439/607 |
| 2008/0186150 A1 * | 8/2008 | Kao | 340/310.11 |
| 2009/0154594 A1 * | 6/2009 | Yeh et al. | 375/295 |

FOREIGN PATENT DOCUMENTS

| | | |
|---|---|---|
| EP | 1136965 | 9/2001 |
| JP | 08186753 | * 7/1996 |
| WO | WO9729317 | 8/1997 |

OTHER PUBLICATIONS

"Firm looks to plug in power-line networks", http://www.networkworld.com/news/2004/0105powerline.html 2004.

* cited by examiner

*Primary Examiner* — Nicholas Giles
*Assistant Examiner* — Cynthia Calderon
(74) *Attorney, Agent, or Firm* — Fitch, Even, Tabin & Flannery (57) ABSTRACT

A wall-mounted security camera is provided. A camera unit captures video within a field of vision of the camera unit. A base module couple to a power outlet, controls the camera unit, receives an input video signal from the camera unit, and transmits an output video signal across a network. A configurable rod is in communication with the camera unit and the base module. A first end of the configurable rod is mounted on the base module and a second end of the configurable rod is mounted on the camera unit. The configurable rod is movable between a first position where the camera unit is a maximum distance from the base module and a second position where the camera unit is disposed adjacent to the base module.

20 Claims, 9 Drawing Sheets

WALL MOUNT CAMERA

RELATED APPLICATION DATA

This application claims priority to provisional application Ser. No. 60/873,460, filed Dec. 6, 2006, the disclosure of which is hereby incorporated by reference herein in its entirety. This application is related to U.S. patent application Ser. No. 10/624,706 entitled "Power Line Communication Based surveillance System," filed Jul. 21, 2003, the disclosure of which is incorporated by reference in its entirety;

FIELD OF THE APPLICATION

The present invention relates generally to a configurable security camera.

BACKGROUND

The home network market is expanding rapidly. One of the most anticipated applications is a networked household security system. There are various demands for this security system such as, for example, monitoring a visitor at a door, watching a baby from a different room, and checking a monitored home remotely while traveling. Unfortunately, one problem with this type of security system is the requisite camera installation. Specifically, a security camera must be installed with an arm and a base at a high place in order to get as full of a view of the monitored area as possible.

Such security camera installation is cumbersome and can be expensive. Security cameras normally receive power from an AC outlet. Unfortunately, such AC outlets are typically located close to the floor, requiring wiring be installed from the security cameras to the AC outlets. Such wiring can be expensive and require substantive installation. Moreover, because current security cameras are mounted onto a wall or ceiling, a maintenance person must typically install them. Installing such security cameras onto a wall or ceiling can result in unsightly damage to the ceiling and/or wall to which the security camera is mounted.

An additional problem with current security camera systems is that they are typically hard wired to a recording device where their video output can be recorded or viewed such as, for example, a room where a security guard can watch video from one or more security cameras. Such wiring can be very expensive, unsightly, and difficult to maintain.

Accordingly, the current security camera systems are costly, take up a lot of physical space, and require manual installation onto the wall or ceiling that may result in unsightly damage. Moreover, the current systems are deficient in the way in which they send video to a monitoring room via a hard-wired connection.

SUMMARY

The present invention is directed to a wall-mounted security camera. A camera unit captures video within a field of vision of the camera unit. A base module couple to a power outlet, controls the camera unit, receives an input video signal from the camera unit, and transmits an output video signal across a network. A configurable rod is in communication with the camera unit and the base module. A first end of the configurable rod is mounted on the base module and a second end of the configurable rod is mounted on the camera unit. The configurable rod is movable between a first position where the camera unit is a maximum distance from the base module and a second position where the camera unit is disposed adjacent to the base module.

The present invention is further directed to a surveillance system. The system includes a network and at least two security cameras. Each of the at least two security cameras includes a camera unit a capture video within a field of vision of the camera unit. The security cameras also include a base module to couple to a power outlet, control the camera unit, receive an input video signal from the camera unit, and transmit an output video signal across the network. The security camera further includes a configurable rod in communication with the camera unit and the base module. A first end of the configurable rod is mounted on the base module and a second end of the configurable rod is mounted on the camera unit. The configurable rod is movable between a first position where the camera unit is a maximum distance from the base module and a second position where the camera unit is disposed adjacent to the base module. A server receives the output video signal from the power line network.

The present invention is also directed to a method of operating a wall-mounted security camera having a base module coupled to a power outlet, a camera unit, and a configurable rod coupled to the base module and to the camera unit. The method includes changing a distance between the base module and the camera unit by manipulating the configurable rod. Video is captured within a field of vision of the camera unit. An input video signal is sent from the camera unit to the base module. A corresponding output video signal is transmitted across a network.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The above and other aspects, features and advantages of the present embodiments will be more apparent from the following more particular description thereof, presented in conjunction with the following drawings wherein.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Embodiments of the present invention are directed to a surveillance system for monitoring a designated area. The surveillance system includes one or more surveillance cameras, each of which has a base module that contains circuitry and also includes a plug. The plug may be inserted into a standard household AC outlet or into any other suitable power outlet. The plug draws power from the AC outlet when inserted into an AC outlet that is disposed along a wall.

A configurable rod, such as a retractable rod, is extendable from a top surface of the base module. One end of the rod is coupled to the base module and the other end is coupled to a camera unit for acquiring video images. The rod may be collapsible, much like an antenna used on a radio or other electronic device. In the event that the rod is collapsible, the rod may be formed of a plurality of segments, where each successive segment has a slightly smaller diameter than the segment below it. In one position, all of the segments are "pushed down" with each larger segment much like a collapsible radio antenna when the radio is not in use. In another position, all of the segments are "pulled up" such that the portion of each segment within each successive larger segment is minimized and the total length between the top send of the smallest segment is maximized relative to the bottom end of the largest segment that is mounted/attached to the base module.

In alternative embodiments, the rod may be folded/unfolded instead of collapsible to configure the distance between the base module and the camera unit.

The rod may be made of a metallic material or a plastic, for example. The end of the rod located opposite of the base module is coupled to the camera unit. The camera unit may be used as a security camera unit to capture video of a designated area, such as a room, or a section of the room, in a house or office building.

AC outlets are usually located near the floor in an area to be monitored. Security cameras, on the other hand, are typically located near the ceiling of an area. In order to effectively monitor the area, the user may plug the base module into an AC outlet located near the floor and then extend the rod so that the camera is located near the ceiling and is in proper alignment to capture video. The camera unit captures the video and generates a video signal. The video signal may be an analog signal and is sent from the camera to circuitry within the base module. The rod may include or contain several conductors (or pairs of conductors) to communicate the video signal and provide power to the camera. For example, a first conductor (or pair of conductors) may be utilized to couple electrical power from the base module to the camera, a second conductor may be utilized to couple a Null or Ground reference from the base module to the camera, and a third conductor (or pair of conductors) may be utilized to couple the video signal generated by the camera to the base module. Each of these conductors may be incorporated into the rod and/or housed within the rod.

The video is converted into a digital video signal by circuitry within the base module and is subsequently transmitted across a network via the plug. Alternatively, the video is converted into a digital format by circuitry within the camera unit prior to sending the video signal to the base unit. The network may be a powerline communication network such as that disclosed in U.S. patent application Ser. No. 11/271,038, which is incorporated by reference in its entirety.

The powerline communication network provides for communication between the various components through the wires of the AC power grid of the house. Specifically, powerline communication technology uses household electrical power wiring as a transmission medium. Powerline communication devices often operate by modulating a carrier wave into the household wiring at a transmitter. The carrier is modulated by digital signals. Each receiver in the system has an address and can be individually commanded by the signals transmitted over the household wiring and decoded at the receiver. These devices may either be plugged into regular power outlets or else permanently wired in place.

The powerline communication network may employ Orthogonal Frequency Division Multiplex ("OFDM"), in which hundreds of sub-carriers between 1 and 30 MHz are modulated and transmitted to a receiver. The type of specific modulation used in the network can depend on the signal to noise ratio ("SNR") of one or more sub-carriers. When SNR is good, a high-density modulation, for example, Quadrature Amplitude Modulation ("QAM") can be used, but for lower SNR a more robust modulation, a low-density, robust modulation, for example, Quadrature Phase Shift Keying ("QPSK") modulation may be selected.

In operation, a user plugs the base module into the AC outlet to gain access to the powerline network. Once the video has been converted into the digital format by an analog-to-digital converter within the base module (or within the camera unit), the video signal is transmitted across the powerline network. A server or other electronic device connected to the powerline network receives the digital video signal via another AC outlet or some other access point to the powerline network. To effectively monitor a large area or several rooms within a house, for example, multiple surveillance system may be utilized and each of the surveillance system may transmit its own video signal to the server via the powerline network. The server may be in communication with an outside network, such as the Internet, and may transmit the video data received via the powerline communication network to the outside network. Accordingly, a remote monitoring station can receive the video from the network and remotely view the video.

It should be appreciated that in some embodiments of the invention, audio may also be captured in addition to video. For example, a microphone may be included to detect the audio, and the audio may be converted into a digital format for transmission over the powerline network. The microphone may be located away from the base module near the camera unit and may receive power via a communication path in within the rod and provide a signal corresponding to detected audio to the base module via another communication path. In alternative embodiments, the microphone may be disposed apart from the camera unit and may detect and wirelessly transmit a signal corresponding to the detected audio to the base module. Once received by the base module, the data in the audio signal may be transmitted over the powerline. In some embodiments, multiple packets of video data are transmitted via the powerline network followed by one or more audio packets.

Figure 1:
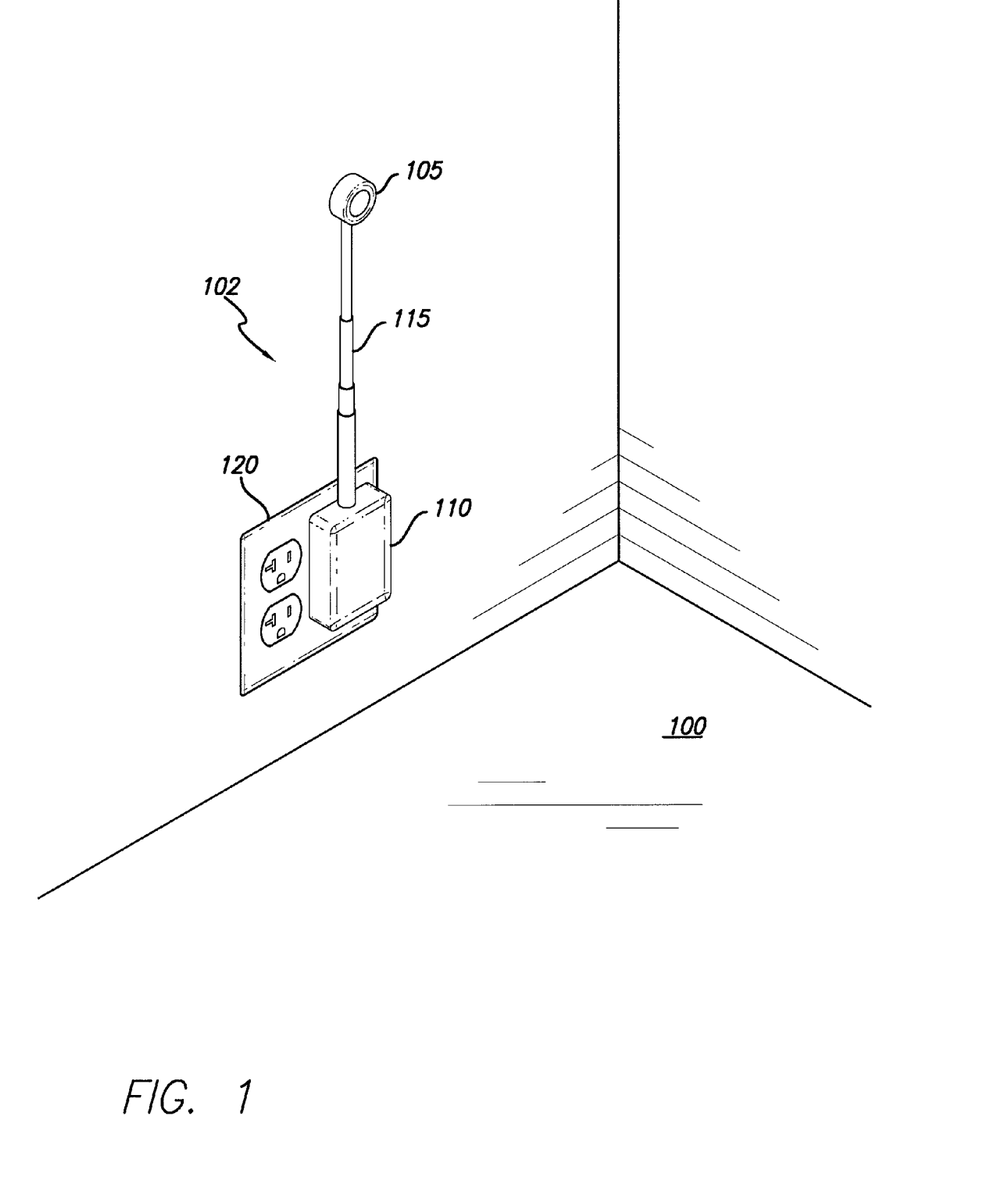
FIG. 1 illustrates a surveillance system according to at least one embodiment of the invention.

FIG. 1 illustrates a surveillance system 100 according to at least one embodiment of the invention. As shown, the surveillance system 100 includes a security camera 102. The security camera 102 includes a camera unit 105 in communication with a base module 110 via a retractable rod 115. Alternatively, another type of configurable rod may be utilized, such as a foldable rod. The surveillance system 100 may be utilized to monitor a room or some other enclosure or area by acquiring video images of the room or area. The base module 110 includes a plug (not shown) that plugs into an AC outlet 120 or some other power outlet. The AC outlet 120 may be a standard 120 Volt household AC outlet. The base module 110 receives power from the AC outlet 120.

The plug includes prongs that may be inserted into the AC outlet 120, as discussed below with respect to FIGS. 2 and 3. When inserted into the AC outlet 120, AC power is provided to the base module 110. The base module 110 includes a half wave rectifier or other circuitry that converts the AC power into a DC power signal that is provided to various circuitry within the base module and the camera unit 105. The base module 110 also includes a processor and circuitry for communicating data, such as video and/or audio data, through a powerline network. The powerline network is utilized to communicate the data via the electrical wiring/communication path within a house or office. In some embodiments, video and/or audio data transmitted to the powerline network is received by a server located at another access point of the powerline network. Alternatively, the video and/or audio data may be received by a computer or other processing device capable of generating video images and/or audio from the video and/or audio data transmitted via the powerline network. The computer or other processing device may display such video and/or audio on a monitor and a security person can monitor the video images and/or audio data.

Upon inserting the plug on the base module 110 into the AC outlet 120, a user extends or retracts the retractable rod 115, depending on the specific height requirements of the application. For example, in an embodiment where the AC outlet 120 is disposed near the ground, the user extends the rod so that the camera unit 105 coupled to the end of the retractable rod 115 disposed away from the base unit is high enough and at a proper position to acquire a view of the room or area being monitored. The length to which the retractable rod may be extended is dependent upon the specific application. For example, in a room with an eight-foot ceiling, the user might extend the retractable rod 115 six feet to ensure that the camera until is high enough to acquire a good surveillance video. On the other hand, if the room has 12 foot ceilings, the user might extend the retractable rod 115 eight feet to ensure that the camera unit 105 until is disposed at a high enough location to acquire satisfactory video images. In some embodiments, the retractable rod 115 is also bendable so that the user can position the location of the camera unit more precisely. For example, in some embodiments, if might be advantageous to extend the rod six feet vertically and 2 feet horizontally. In some embodiments, the user can bend the retractable rod 115 at a location near the base module 110 to position the retractable rod 115. However, in the event that an object, such as a file cabinet, is positioned such that the retractable rod 115 has no room to extend in the direction of the file cabinet, the retractable rod 115 may be bendable at a location near its top end or middle section as discussed below with respect to FIG. 4.

The retractable rod 115 may be formed of a collapsible metal or plastic. In the event that the rod is collapsible, the rod may be formed of a plurality of segments, where each successive segment has a slightly smaller diameter than the segment below it, as discussed below with respect to FIG. 5. In one position, all of the segments are pushed down with each larger segment much like a collapsible radio antenna when the radio is not in use. In another position, all of the segments are "pulled up" such that the portion of each segment within each successive larger segment is minimized and the total length between the top send of the smallest segment is maximized relative to the bottom end of the largest segment that is mounted/attached to the base module.

Alternatively, the retractable rod 115 may be formed of a foldable plastic or metal, or any other deformable material such that its length can be manipulated. The retractable rod 115 may be extendable to a height of eight feet in some embodiments, although the actually height the height may be larger or less than eight feet in other embodiments. The camera unit 105 contains circuitry for capturing video of the area being monitored. The camera unit may be a digital video camera having a CMOS imager for capturing a plurality of video frames. In some embodiments the CMOS imager acquires 30 frames per second. In other embodiments, the CMOS imager acquires fewer frames, such as 1 frame per second. In the event that digital storage space or network bandwidth is an issue, a lower image capture rate may be preferable.

Figure 2:
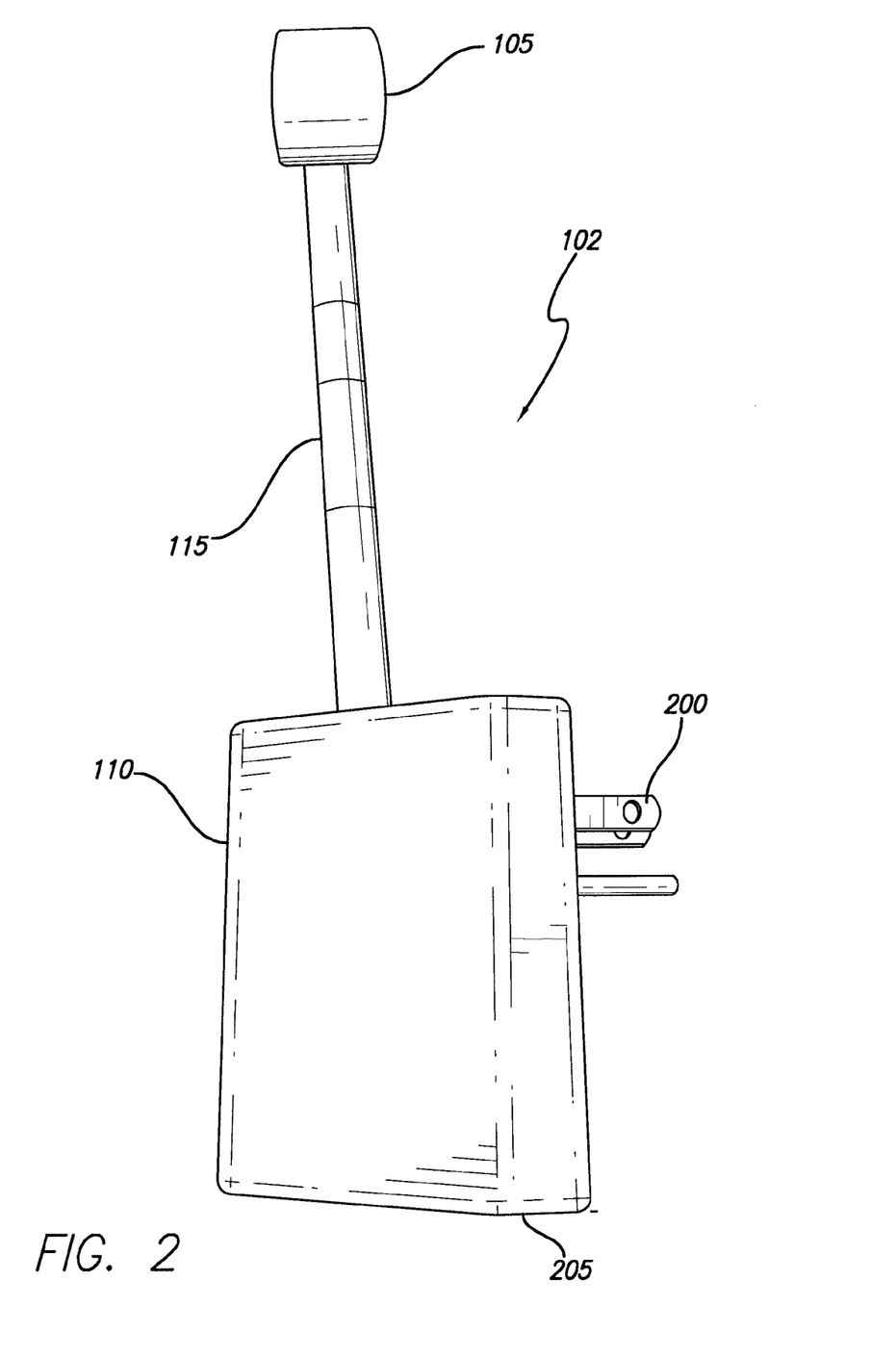
FIG. 2 illustrates a side view and FIG. 3 illustrates a front view of the wall mounted security camera according to at least one embodiment of the invention.
Figure 3:
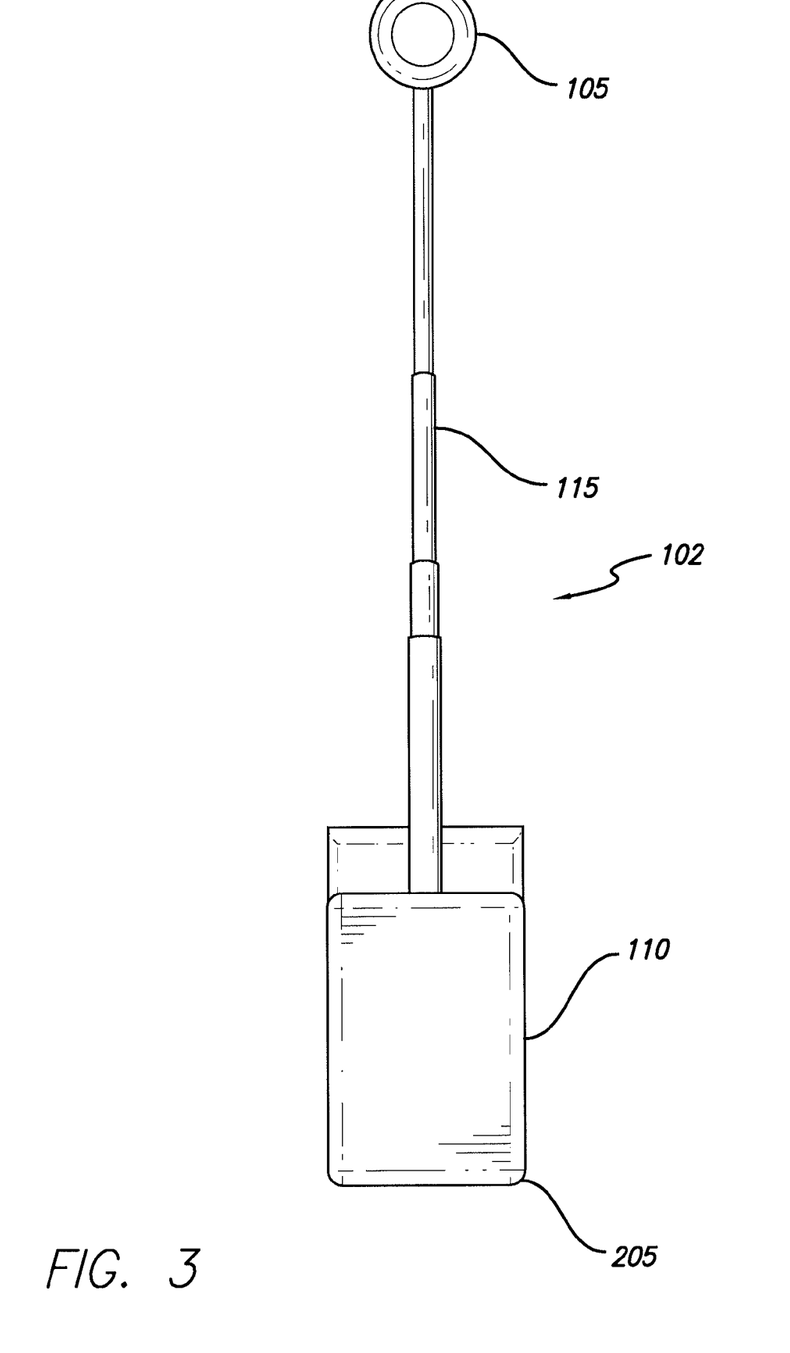

FIG. 2 illustrates a side view and FIG. 3 illustrates a front view of the wall mounted security camera 102 according to at least one embodiment of the invention. As shown, and as discussed above with respect to FIG. 1, the wall mounted security camera 102 includes a camera unit 105, a base module 110, and a retractable rod 115. The base module 110 includes a plug 200 or prongs that may be used to plug the base module 110 of the security camera 102 into an AC outlet. As discussed above, a user may insert the plug 200 into an AC outlet 120 to both receive AC power and access a powerline network for data communication.

The base module 110 contains various circuitry within a casing 205, such as a processor and a half wave rectifier or other circuitry to convert received AC power into DC power. The casing 205 may be formed of a plastic material. The circuitry is utilized to provide power to the camera unit 105 and process a video signal received from the camera unit 105. The base module 110 may house three or more conductors, such as conductive wires, extending between the circuitry of the base module 110 and the camera unit 105. A first conductor may be utilized to transmit electrical power from the base module 110 to the camera unit 105, a second conductor may be utilized to transmit a Null or Ground reference from the base module 110 to the camera unit 105, and a third conductor may be utilized to transmit a video signal generated by the camera unit 105 down to the base module 110. The user may change the length of the retractable rod 115. In FIG. 2, for example, the camera unit 105 is in relatively close proximity to the base module 110 because the retractable rod 115 is in a retracted position. On FIG. 3, on the other hand, the retractable rod 115 is partially extended such that the camera unit 105 is farther away from the base module 110.

Figure 4:
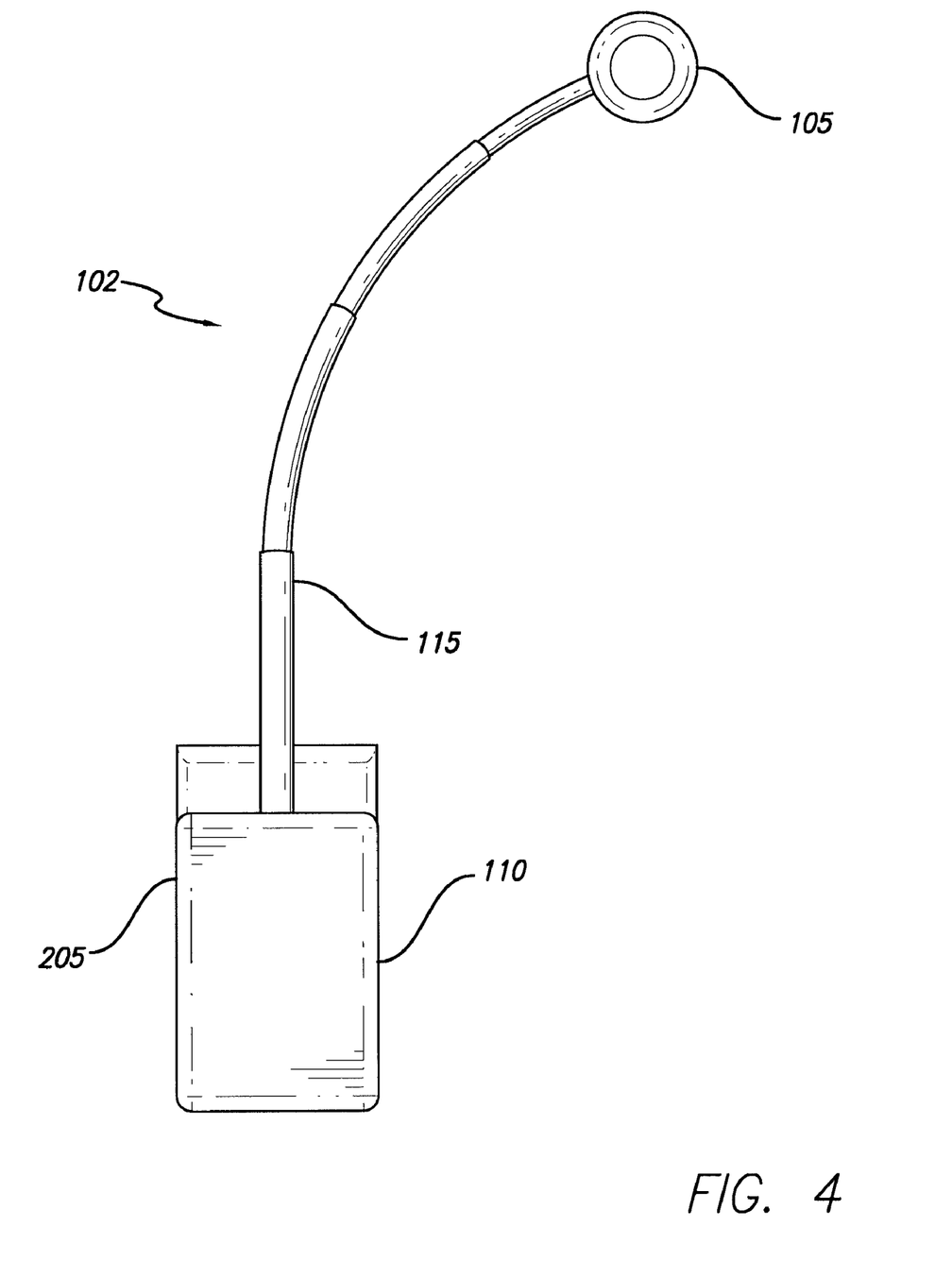
FIG. 4 illustrates a front view of the wall mounted security camera where the retractable rod is flexible according to at least one embodiment of the invention

FIG. 4 illustrates a front view of the wall mounted security camera 102 where the retractable rod 115 is flexible according to at least one embodiment of the invention. As shown, the retractable rod 115 is flexible and may be bent to achieve the proper angle and positioning of the camera unit 105 to acquire optimal video images and/or audio of the area or enclosure being monitored. In this example, the flexible rod 115 may comprise a gooseneck flexible rod and may be bendable to angles of 90 degrees or more in some embodiments. This may be particularly valuable for embodiments in which the AC outlet providing power to the base unit 110 is located behind a file cabinet or there is some other object obstructing the view of the camera unit 105. Moreover, in an embodiment in which the security camera 102 is connected to a power strip located on the floor, for example, instead of to an AC outlet disposed on the wall, the user may need to bend the retractable rod 115 at a large angle to achieve the proper positioning of the camera unit 105. The camera unit 105 may have a tilt and/or panning mechanism in order to get more angular freedom.

Figure 5:
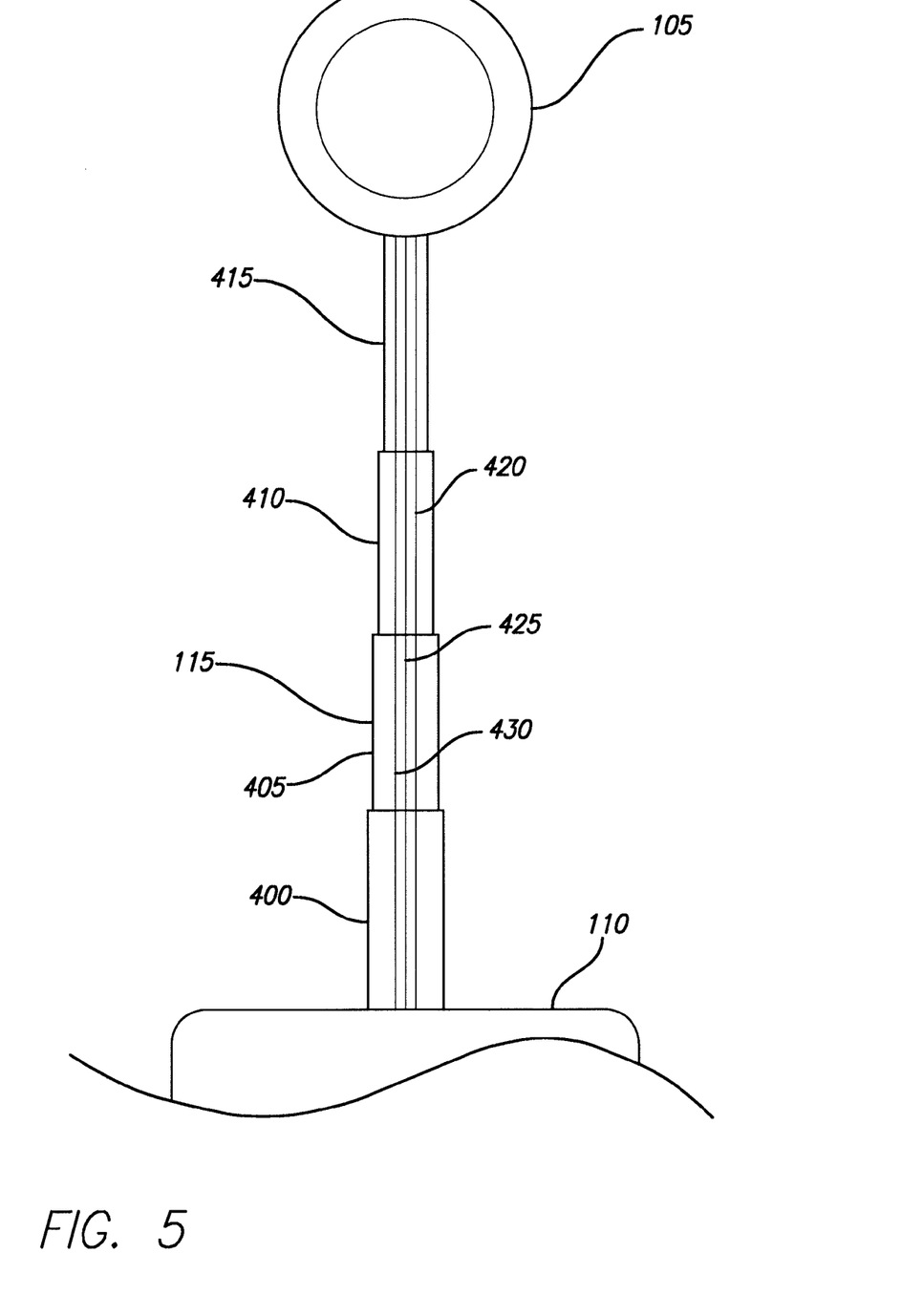
FIG. 5 illustrates an enlarged view of the retractable rod according to at least one embodiment of the invention.

FIG. 5 illustrates an enlarged view of the retractable rod 115 according to at least one embodiment of the invention. In this example, the retractable rod 115 is formed of a plurality of segments. As shown, the retractable rod 115 is formed of a first segment 400, a second segment 405, a third segment 410 and a fourth segment 415. These segments may be collapsed when in a fully retracted mode. It should be appreciated that four segments are shown for the sake of simplicity and more or fewer than four segments may be utilized in other embodiments. A user may manually push the camera unit 105 in a direction toward the base module 110 to retract the retractable rod 115. Similarly, the user may manually extend the rod by pulling the camera unit 105 in a direction away from the base module 110. At least three conductors or communication/electrical paths are disposed within the retractable rod 115. A first conductor 420 may provide a power signal to the camera unit 105 to power the camera unit 105. A second conductor 425 may provide a NULL or Ground reference from the base module 110 to the camera unit 105. A third conductor 430 is utilized to transport a video signal from the camera unit 105 to the base module 110. In other embodiments, the retractable rod 115 may be foldable instead of retractable. The rod 115 may also be a combination of retractable, foldable and gooseneck rods. For example, the three segments 400, 405 and 410 could be retractable and the fourth segment 415 could be a gooseneck.)

Figure 6:
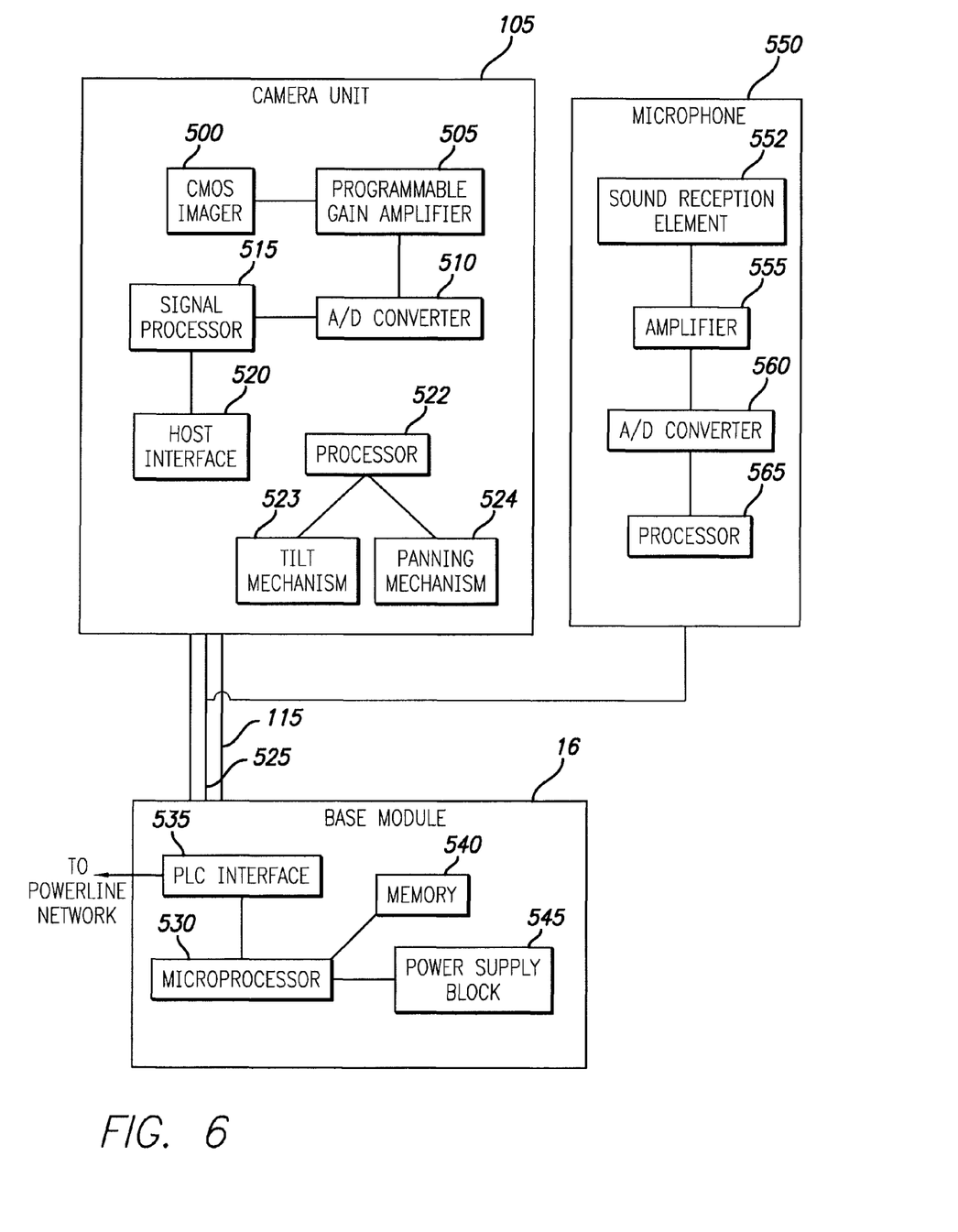
FIG. 6 illustrates various circuitry within the security camera according to at least one embodiment of the invention.

FIG. 6 illustrates various circuitry within the security camera 102 according to at least one embodiment of the invention. As shown, the camera unit 105 includes a Complementary Metal Oxide Semiconductor ("CMOS") imager 500 to capture video images and generate a video signal. The output of the CMOS imager 500 is provided to a programmable gain amplifier 505 that amplifies the video signal. An analog-to-digital ("A/D") converter 510 converts the analog video signal into a digital signal. A signal processor 515 encodes the digital video signal. In some embodiments the digital video signal is encoded according to Moving Picture Experts Group ("MPEG")-1. A host interface 520 provides the encoded digital video signal to a bus 525. The host interface 520 also receives control signals from the base module 110 and may control each of the CMOS imager 500, the programmable gain amplifier 505, the A/D converter 510, and the signal processor 515. The CMOS imager 500, the programmable gain amplifier 505, the A/D converter 510, the signal processor 515, and host interface 520 may all be disposed on a small silicon chip for a "system-on-a-chip" solution.

The camera unit 105 also includes elements for positioning the camera unit 105 to ensure that the camera unit 105 is in position to acquire video images. For example, the camera unit 105 may include a processor 522, a tilt mechanism 523, and a panning mechanism 524. The tilt mechanism 523 may be utilized to tilt the camera unit 105, and the panning mechanism 524 may be utilized to pan the camera unit back and forth to acquire video images from different locations within the area, room, or enclosure being monitored. The tilt mechanism 523 and panning mechanism 524 are controlled by the processor 522. In some embodiments, the tilt mechanism 523 and panning mechanism 524 may be directly controlled by the signal processor 515 in which case a separate processor 522 would not be required. In other embodiments, a manual tilt mechanism 523 and a manual panning mechanism may instead be utilized to allow the user to adjust the security camera to get a good view and fix it manually.

The bus 525 is housed within the retractable rod 115. The bus 525 comprises at least one of the conductors or communication paths shown in FIG. 5 for communicating power and the video signal between the camera unit 105 and the base module 110.

The base module 110 receives the encoded digital video signal. The base module 110 includes a microprocessor 530 that controls a programmable logic controller ("PLC") interface 535. The base module 110 also includes a memory 540. The memory 540 may store program code or instructions to be executed by the microprocessor 530. The base module 110 also includes a power supply block 545. When the prongs of the base module are plugged into the AC outlet, the base module 110 draws AC power from the AC outlet. However, the base module 110 and camera unit 105 both operate on DC power in some embodiments. Accordingly, a rectifier or other circuitry is included in the power supply block to covert the source AC power into DC power to be used by the various components within the base module 110 and the camera unit 105.

The PLC interface 535 is utilized for transmitting the encoded video signal and/or an encoded digital audio signal across the powerline network to a server in some embodiments.

In some embodiments, a microphone unit 550 is included for capturing sound in the area being monitored. The microphone unit 550 includes a sound reception element 552, an amplifier 555, a signal processor 560, and an A/D converter 565 to convert an analog audio signal to a digital format. The output of the microphone unit 550 is provided to the bus 525. In some embodiments the microphone unit 550 is physically attached to the to camera unit 105. In other embodiments, on the other hand, the microphone unit 550 is disposed apart from the camera unit 105. In some embodiments, the microphone unit 550 includes its own power supply and wirelessly communicates detected audio data to the base module 110.

Figure 7:
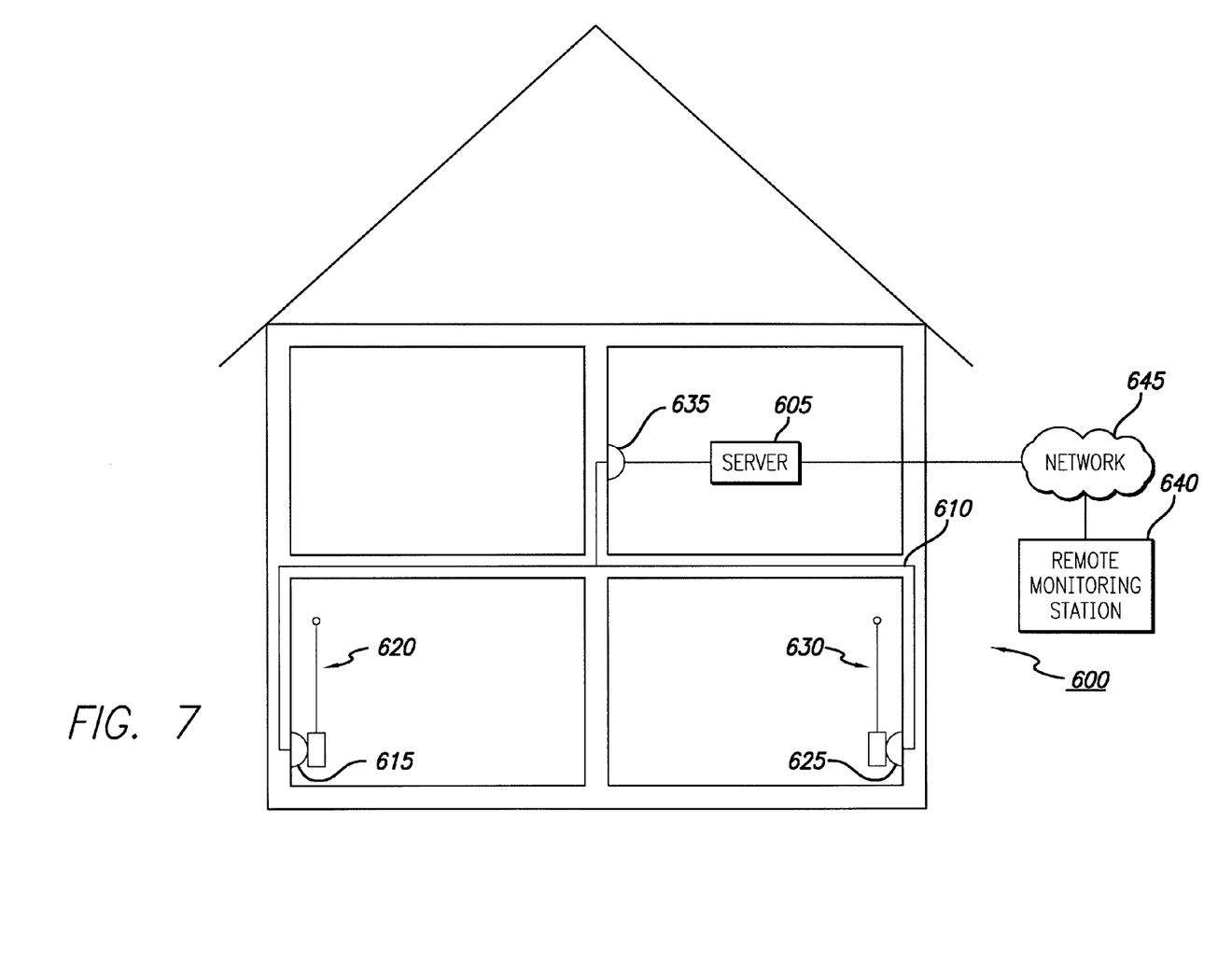
FIG. 7 illustrates a surveillance camera monitoring system according to at least one embodiment of the invention.

FIG. 7 illustrates a surveillance camera monitoring system 600 according to at least one embodiment of the invention. As shown the surveillance camera monitoring system 600 includes a server 605, a network 610, a first outlet 615, a first camera 620, a second outlet 625, a second camera 630, and a third outlet 635. The first outlet 615, the second outlet 625, and the third outlet 635 may each be a standard household AC outlet similar to the one shown in FIG. 1. The first camera 620 and the second camera 630 may be similar to the one described above with respect to FIGS. 2-5. The network 610 is a powerline network and is accessible via the first outlet 615, the second outlet 625, and the third outlet 635. The server 605 is adapted to receive the encoded video signals and/or audio signals from the network 610. The server 605 may include a memory to store these signals and/or a processor to decode the signals and display the corresponding video and/or audio on a monitoring unit such as a video monitor.

Although only a single server 605 and two cameras 620 and 630 are shown, it should be appreciated that any number of these elements may be utilized according to other embodiments. For example, when monitoring a large area or a lot of different rooms, it may be advantageous to include many different camera units.

The server 605 may be connected to an external network 645, such as the Internet. The server 605 transmits the video and/or audio data received via the powerline network 610 to the external network 645. A remote monitoring station 640 is in communication with the network 645 and receives the video and/or audio from the network 645. The remote monitoring station 640 may comprise a computer or other electronic device from displaying the video and/or audio data received. Accordingly, the remote monitoring station 640 permits a user to remotely monitor the video and/or audio detected by the camera monitoring system 600.

Figure 8:
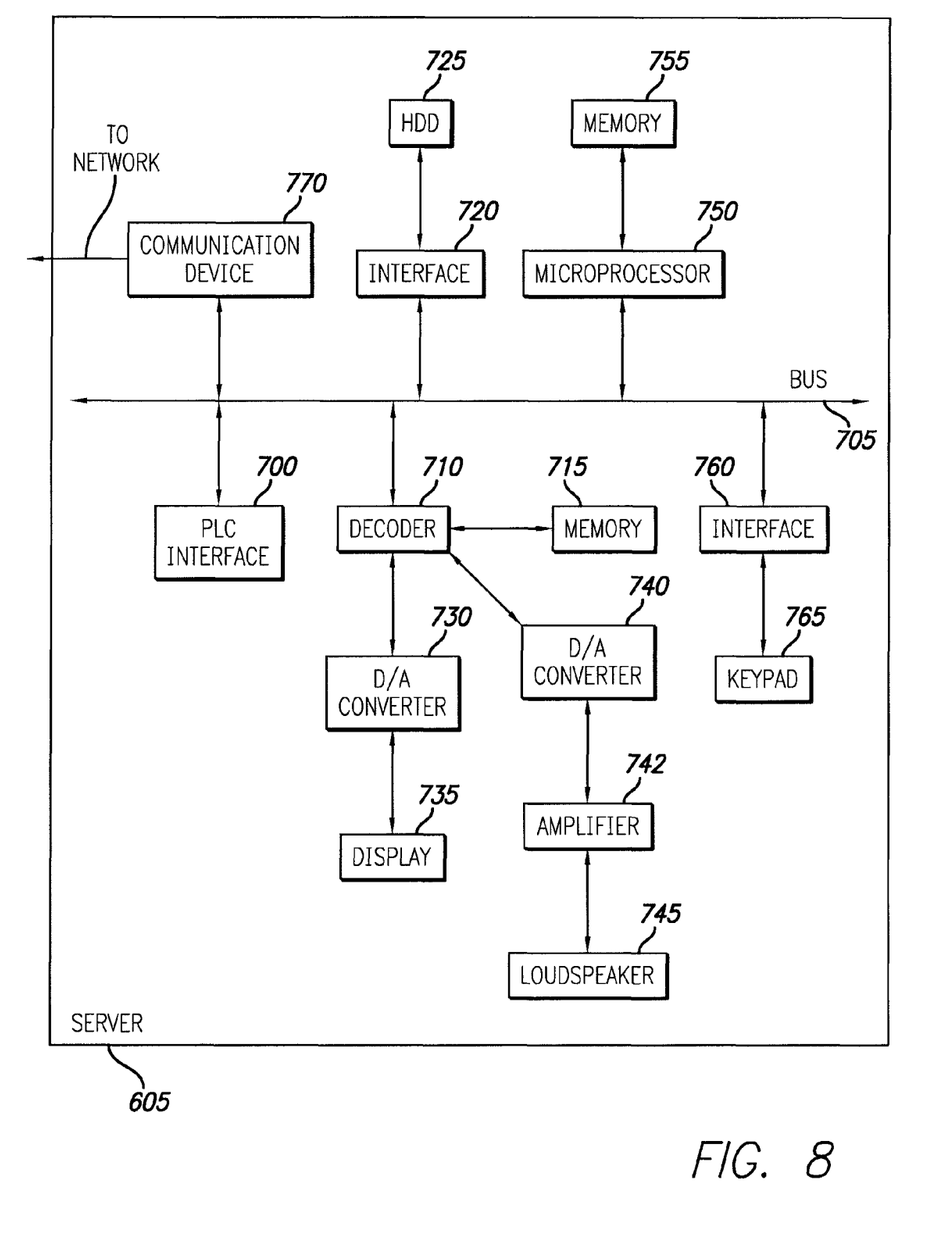
FIG. 8 illustrates a server according to at least one embodiment of the invention.

FIG. 8 illustrates a server 605 according to at least one embodiment of the invention. The server 605 includes a powerline communication ("PLC") interface 700 to receive the encoded video signals and/or audio signals from the powerline network. The PLC interface 700 is in communication with a bus 705, such as a 68 k bus or Peripheral Component Interconnect ("PCI") bus. A decoder 710 is in communication with the bus 705.

The decoder 710 decodes the encoded signals received and stores data/information in the decoded signal in a first memory 715. The first memory 715 may be utilized to store decoded video about to be displayed. The decoder 710 may also transfer the encoded signals to a first interface 720 via the bus 705. The encoded signals are subsequently provided to a hard disk drive ("HDD") 725 via the first interface 720. The HDD 725 may be utilized to archive video. The decoder 710 is in communication with a first D/A converter 730. The first D/A converter 730 coverts the decoded digital signal into an audio signal for display on a display 735. The display 735 may be, for example, a security monitor.

The decoder 710 is also in communication with a second D/A converter 740. The second D/A convert 740 is utilized in the event that audio data was transmitted over the powerline network, in which case the output of the second D/A converter 740 is provided to an amplifier 742 that serves to amplify a preselected range of the analog audio signal. The amplified audio signal is provided to a loudspeaker 745 and converts the amplified audio signal into sound.

Some components within the server 605 are in communication with a microprocessor 750 that controls their operation. The microprocessor is in communication with a second memory 755. The second memory 755 may be utilized to store program code to be executed by the microprocessor 750.

The server 605 may also include a second interface 760. A keypad 765 is in communication with the second interface 760. The keypad 765 may be utilized by a user to control the operation of the server 605. For example, the user can enter a code via the keypad 765 to cause video stored on the HDD 725 to be played back for viewing.

The server 605 also includes a communication device 770. The communication device 770 may be a modem and transmits and receives data signals to and from a network such as the Internet. The decoder 710, the memory 715, the first D/A converter 730, the second D/A converter 740, the display 735, the amplifier 742, the loudspeaker 745, the microprocessor 750 and the keypad 765, for example, may be shared and used to decode (terrestrial, cable or satellite) digital broadcast signals.

Figure 9:
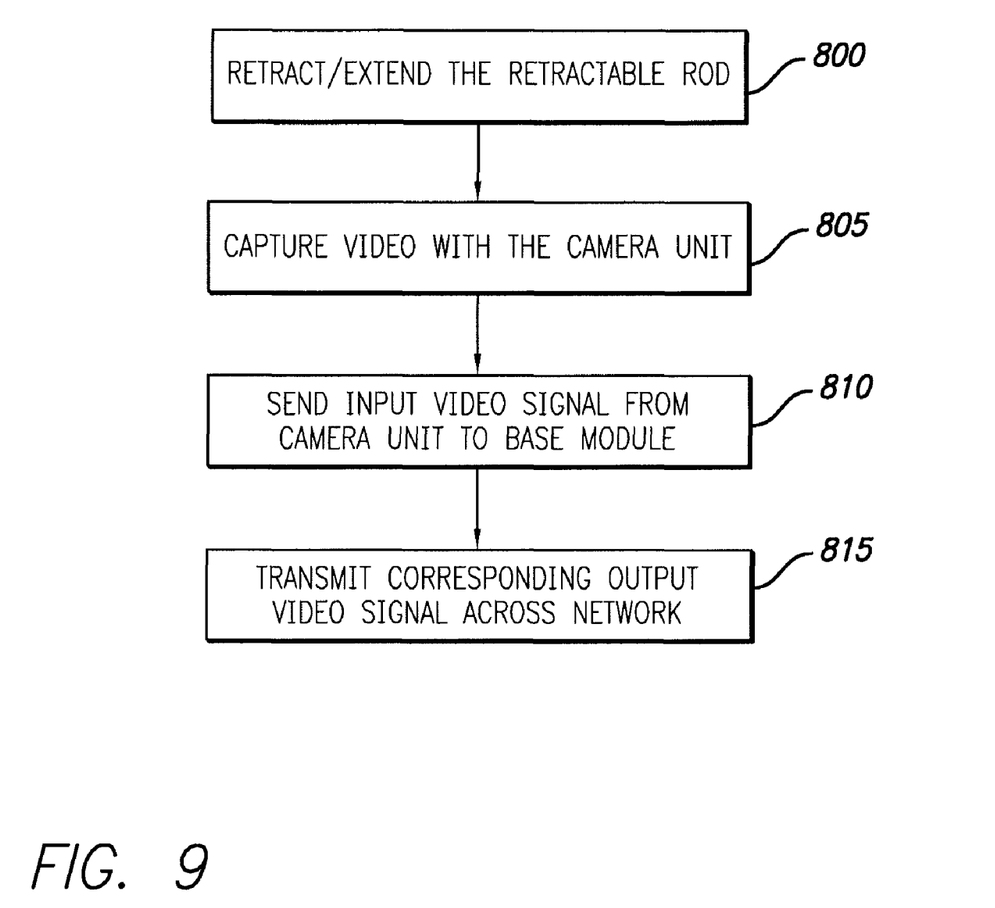
FIG. 9 illustrates a method of utilizing the security camera system according to at least one embodiment of the invention.

FIG. 9 illustrates a method of utilizing the surveillance camera monitoring system according to at least one embodiment of the invention. First, the user retracts or extends the retractable rod 115 at operation 800. In alternative embodiments where the rod is foldable instead of retractable, the user may fold or unfold the rod. Next, video is captured by the camera unit at operation 805. As operation 810 the video input signal is sent from the camera unit 105 to the base module 110. The input video signal may be converted to a digital signal and encoded prior to being sent to the base module, as discussed above with respect to FIG. 6. The video signal is subsequently transmitted across the powerline network at operation 815.

Embodiments of the present invention are directed to a surveillance system for monitoring an area. The surveillance system includes one or more wall-mounted cameras for monitoring designated areas. Each wall-mounted camera includes a base module that contains circuitry and also includes a plug. The plug may be inserted into a standard household AC outlet or into any other suitable power outlet. The plug draws power from the AC outlet when inserted into an AC outlet that is disposed along a wall.

A configurable rod is coupled to the base module and to a camera unit. In some embodiments the configurable rod is retractable/extendable from a top surface of the base module. The rod may be collapsible, much like an antenna used on a radio or other electronic device. Alternatively, a foldable rod may be used. The camera may be used as a security camera unit to capture video of a designated area, such as a room, or a section of the room, in a house or office building.

The use of the configurable rod and a base mounted on an outlet provides a compact design that is easy to install in an area to be monitored and avoids the unsightly wiring and drilling that is typically required by current surveillance systems.

A user plugs the base module into the AC outlet to gain access to the powerline network. Once the video has been converted into the digital format by an analog-to-digital converter within the base module (or within the camera unit), the video signal is transmitted across the powerline network. A server or other electronic device is connected to the powerline network and receives the digital video signal via another AC outlet or some other access point to the powerline network. To effectively monitor a large area or several rooms within a house, for example, multiple security cameras may be utilized and each of the security cameras may transmit its own video signal to the server via the powerline network.

It should be appreciated that in some embodiments of the invention, audio may also be captured in addition to video. For example, a microphone may be included to detect the audio, and the audio may be converted into a digital format for transmission over the powerline network. The microphone transmits detected audio data to the base module, which in turn transmits the audio data via the powerline network.

Although the embodiments described above are directed a camera unit that is in direct electrical communication with a base unit, it should be appreciated that in other embodiments, the camera unit is in wireless communication with a receiver in the base unit, in which case wiring within the rod would not be required. In such embodiments, the camera unit may include its own power source, such as one or more batteries.

Also, the network may be not powerline communication network in some embodiments. For example, the network could be wireless such as, for example, an 802.11 WiFi network. In such embodiments, the rod may be used as an antenna.

This invention has been described in detail with reference to various embodiments. Not all features are required of all embodiments. It should also be appreciated that the specific embodiments described are merely illustrative of the principles underlying the inventive concept. It is therefore contemplated that various modifications of the disclosed embodiments will, without departing from the spirit and scope of the invention, be apparent to persons of ordinary skill in the art. Numerous modifications and variations could be made thereto by those skilled in the art without departing from the scope of the invention set forth in the claims.

What is claimed is:

1. A wall-mounted security camera, comprising:
    a camera unit to capture video within a field of vision of the camera unit;
    a base module coupled directly to a wall-mounted power outlet, the based module configured to control the camera unit, receive an input video signal from the camera unit, and transmit an output video signal across a network, wherein the base module comprises a housing having prongs to directly couple to the wall-mounted power outlet, and further comprises circuitry to convert AC power from the power outlet to DC power to provide power to the camera unit; and a configurable rod in communication with the camera unit and the base module configured to position the camera unit with respect to the base module, wherein a first end of the configurable rod is mounted on the base module and a second end of the configurable rod is mounted on the camera unit, the configurable rod being movable between a first position where the camera unit is positioned a maximum distance from the base module and a second position where the camera unit is disposed adjacent to the base module.

2. The camera system of claim 1, wherein the network comprises a power line network accessible via the power outlet.

3. The camera system of claim 1, wherein the input video signal is an analog signal and the output video signal is a digital signal, and the base module comprises an analog-to-digital converter to convert the input video signal into the output video signal for transmission across the network.

4. The camera system of claim 1, wherein at least three electrical signal paths are disposed within the configurable rod, a first electrical signal path being utilized to transmit power from the base module to the camera unit, a second electrical path being utilized to transmit a ground reference from the base module to the camera unit, and a third electrical path being utilized to transmit the input video signal from the camera unit to the base module.

5. The camera system of claim 1, wherein the power outlet is an A/C outlet.

6. The camera system of claim 1, further comprising a microphone to capture audio, wherein the base module is adapted to receive an input audio signal from the microphone and transmit a corresponding output audio signal across the network.

7. The camera system of claim 1, wherein the configurable rod is one of: a retractable rod, a foldable rod, a flexible gooseneck rod, and a combination thereof.

8. The camera system of claim 1, wherein the camera unit comprises at least one of a tilt mechanism and a panning mechanism.

9. The camera system of claim 1, wherein the output video signal is transmitted over a power line network when the base module is coupled to the power outlet.

10. A surveillance system, comprising:
a network;
at least two security cameras, each of the at least two security cameras comprising:
a camera unit to capture video within a field of vision of the camera unit;
a base module coupled directly to a wall-mounted power outlet, the base module configured to control the camera unit, receive an input video signal from the camera unit, and transmit an output video signal across a network, wherein the base module comprises a housing having prongs to directly couple to the wall-mounted power outlet, and further comprises circuitry to convert AC power from the power outlet to DC power to provide power to the camera unit;
a configurable rod in communication with the camera unit and the base module configured to position the camera unit with respect to the base module, wherein a first end of the configurable rod is mounted on the base module and a second end of the configurable rod is mounted on the camera unit, the configurable rod being movable between a first position where the camera unit is positioned a maximum distance from the base module and a second position where the camera unit is disposed adjacent to the base module; and
a server to receive the output video signal from a network.

11. The surveillance system of claim 10, wherein the network comprises a power line network accessible via the power outlet.

12. The surveillance system of claim 10, wherein the input video signal is an analog signal and the output video signal is a digital signal, and the base module comprises an analog-to-digital converter to convert the input video signal into the output video signal for transmission across the network.

13. The surveillance system of claim 10, wherein the power outlet is an A/C outlet.

14. The surveillance system of claim 10, wherein at least one of the at least two security cameras further comprises a microphone to capture audio, wherein the base module is adapted to receive an input audio signal from the microphone and transmit a corresponding output audio signal across the network.

15. The surveillance system of claim 10, wherein at least one of the at least two security cameras further comprises at least one of a tilt mechanism and a panning mechanism.

16. The surveillance system of claim 10, wherein the configurable rod is one of: a retractable rod, a foldable rod, a flexible gooseneck rod, and a combination thereof.

17. A method of operating a wall-mounted security camera having a base module coupled to a wall-mounted power outlet, a camera unit, and a configurable rod coupled to the base module and to the camera unit, the method comprising:
changing a distance between the base module and the camera unit by manipulating the configurable rod:
capturing video within a field of vision of the camera unit;
sending an input video signal from the camera unit to the base module, wherein the base module comprises a housing having a prong to directly couple to the power outlet; and
transmitting a corresponding output video signal across a network.

18. The method of claim 17, wherein the manipulating the configurable rod comprises one of: at least partially extending the configurable rod, at least partially retracting the configurable rod, at least partially folding the configurable rod, and at least partially unfolding the configurable rod.

19. The method of claim 18, wherein the input video signal is an analog signal and the output video signal is a digital signal, the method further comprising converting the input video signal into the output video signal for transmission across the network.

20. The method of claim 17, wherein the transmitting is performed via the power outlet.

* * * * *

UNITED STATES PATENT AND TRADEMARK OFFICE
CERTIFICATE OF CORRECTION

| | | |
|---|---|---|
| PATENT NO. | : 8,031,264 B2 | Page 1 of 1 |
| APPLICATION NO. | : 11/680239 | |
| DATED | : October 4, 2011 | |
| INVENTOR(S) | : Iwamura | |

It is certified that error appears in the above-identified patent and that said Letters Patent is hereby corrected as shown below:

Under RELATED APPLICATION DATA:
Column 1, line 11, delete "entirety;" and insert --entirety.--

Signed and Sealed this
Thirty-first Day of January, 2012

David J. Kappos
*Director of the United States Patent and Trademark Office*